(12) United States Patent
Terzian

(10) Patent No.: US 7,352,278 B2
(45) Date of Patent: Apr. 1, 2008

(54) VEHICLE HAZARD WARNING LIGHTS

(75) Inventor: Berj A. Terzian, Newbury, MA (US)

(73) Assignee: Tritel, LLC, Newbury, MA (US)

( * ) Notice: Subject to any disclaimer, the term of this patent is extended or adjusted under 35 U.S.C. 154(b) by 200 days.

(21) Appl. No.: 11/091,139

(22) Filed: Mar. 28, 2005

(65) Prior Publication Data

US 2006/0214781 A1    Sep. 28, 2006

(51) Int. Cl.
B60Q 1/22 (2006.01)
B60Q 1/26 (2006.01)
B60Q 1/50 (2006.01)
B60Q 1/52 (2006.01)
B60Q 1/34 (2006.01)
B60Q 1/44 (2006.01)

(52) U.S. Cl. ............... 340/471; 340/463; 340/464; 340/468; 340/475; 340/479

(58) Field of Classification Search ......... 340/463–479
See application file for complete search history.

(56) References Cited

U.S. PATENT DOCUMENTS

| | | | | |
|---|---|---|---|---|
| 4,682,146 A | * | 7/1987 | Friedman, III | 340/468 |
| 4,859,988 A | * | 8/1989 | Holtvluwer | 340/471 |
| 5,345,218 A | * | 9/1994 | Woods et al. | 340/479 |
| 5,528,218 A | * | 6/1996 | Rigsby | 340/475 |
| 5,786,752 A | * | 7/1998 | Bucalo et al. | 340/467 |
| 5,798,687 A | * | 8/1998 | Littlejohn et al. | 340/426.23 |
| 5,852,399 A | * | 12/1998 | Pettijohn | 340/467 |
| 5,923,124 A | * | 7/1999 | Paech | 315/80 |
| 6,025,775 A | * | 2/2000 | Erlandson | 340/436 |
| 6,181,243 B1 | * | 1/2001 | Yang | 340/468 |
| 2003/0043033 A1 | * | 3/2003 | Lee | 340/463 |

OTHER PUBLICATIONS

Federal Register/vol. 61. No. 241/Friday, Dec. 13, 1996, Notice 01, Federal Motor Vehicle Safety Standards; Lamps, Reflective Devices and Associated Equipment, pp. 65510-65518.
Federal Register/vol. 63. No. 213/Wed.Nov. 4, 1998, Federal Motor Vehicle Safety Standards; Lamps, Reflective Devices and Associates Equipment, pp. 59482-59492.
Field Test Evaluation of Rear Lighting Deceleration Signals II—Field Test, Oct. 1981, Final Report, Rudolf G. Mortimer, pp. 1 to 7 introduction and Table of Contents, pp. 1-23 Introduction, 4 pages Appendix.

* cited by examiner

*Primary Examiner*—Benjamin C. Lee
*Assistant Examiner*—Lam Pham
(74) *Attorney, Agent, or Firm*—Lucas & Mercanti, LLP

(57) ABSTRACT

A vehicle hazard warning system and method are provided wherein a center high mounted rear stop light ("CHMSL") is connected to the vehicle's 4-way emergency flasher circuit so that it flashes simultaneously with at least the vehicle's rear turn signal lights, and preferably with the front turn signal lights as well. This creates a more effective warning signal that the vehicle is a potential hazard to other vehicles approaching from the rear. The CHMSL can also be connected to automatically commence such flashing simultaneously with activated steady back up lights of the vehicle, whenever the vehicle is moving rearward.

16 Claims, 1 Drawing Sheet

VEHICLE HAZARD WARNING LIGHTS

BACKGROUND OF THE INVENTION

1. Field of the Invention

This invention relates to vehicle hazard warning lights and, more particularly, to the enhancement of such lights to give more effective warnings that a disabled or stalled vehicle is a hazard to other vehicles approaching from the rear.

2. Description of the Prior Art

Passenger vehicles and light trucks are the largest majority of motor vehicles in the United States. Since 1986 all new passenger vehicles, and since 1994 all new light trucks, have been required to include, as standard equipment, a center high mounted rear stop light ("CHMSL") by Federal Motor Vehicle Safety Standard 108, and corresponding regulations and laws of the National Highway Traffic Safety Administration ("NHTSA") and the several states.

This requirement originated from tests performed in 1983 by NHTSA which showed that CHMSLs in taxi cabs and corporate fleets appeared to reduce rear impact crashes by about 35%. However, as time went on, these successful results declined until in 1989, NHTSA found that CHMSLS, in the long term, would only prevent rear impacts in passenger cars by about 4.3%, and by an estimated 5.0% in light trucks. Apparently, as drivers became more accustomed to the CHMSLs, the efficacy of such devices wore off (NIHTSA Technical Report Number DOT HS 808 696, "The Long-Term Effectiveness of Center High Mounted Stop Lamps in Passenger Cars and Light Trucks", March 1998). The purpose of CHMSLs is to avoid collision of a car or light truck in the rear by another approaching vehicle, by signaling that the lead vehicle is braking or has stopped.

A serious hazard arises when a vehicle malfunctions so badly as to become no longer drivable and thus vulnerable on or beside a busy road or highway. To warn of this hazard, all U.S. vehicles are required to have a 4-way flasher system that can be driver initiated to simultaneously flash the two front and two rear turn signal lamps. State vehicle codes require such flashing lamps to be used by the operator of a vehicle that is stopped or disabled (e.g., Pennsylvania Vehicle Code Title 75, § 4305). Some regulations also permit such flashing lamps to be used by drivers while approaching, overtaking or passing an accident or hazard to warn other oncoming drivers of such emergencies (e.g., California Vehicle Code, § 25251 (a)(5).

Despite the advent and long term use of 4-way flashing signal lamps and CHMSLs, rear impact vehicle accidents, especially collisions with stopped or disabled vehicles, continue to be a serious problem in the United States.

SUMMARY OF THE INVENTION

The present invention provides a substantial enhancement of vehicle hazard warning lights in passenger vehicles and light trucks by application of a simple modification that does not incur any significant increase in manufacturing cost or labor. More particularly, the invention is based on the realization that if a CHMSL is flashed simultaneously with at least the two rear turn signal lights, and preferably with the two front turn signal lamps as well, then a much more visible and attention-getting result can be achieved for avoiding the hazards of stopped, disabled or decelerating vehicles being struck in the rear by other oncoming vehicles. Since the CHMSL is already required in passenger cars and light trucks, the simple remedy of including it in the 4-way flasher circuit of the front and rear turn signal lights will not cause any significantly increased manufacturing cost or labor.

Moreover, such a remedy can also be installed to become automatically initiated whenever the vehicle is placed in reverse gear, with the clear back up lamps also automatically turned on, to achieve greater safety and warnings against impacts between the vehicle and objects or individuals located in the vehicle's rearward path.

Further features and details of the invention will be understood by reference to the drawings and the following specific description.

Figure 1:
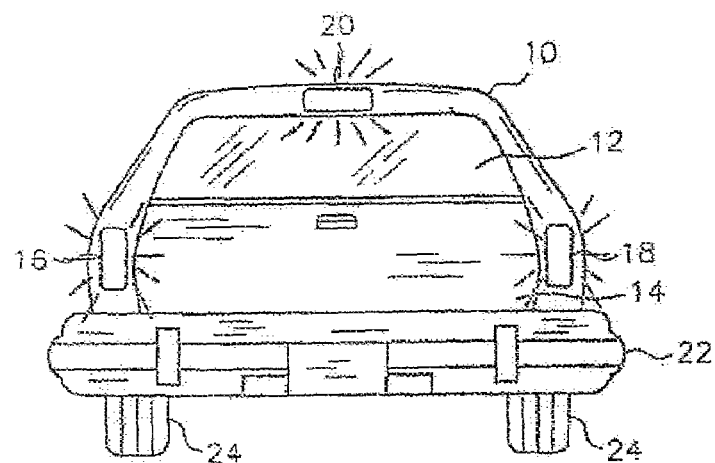
FIG. 1 is a rear view of a vehicle operating in accordance with one embodiment of the invention.

Referring to FIG. 1, it illustrates the configuration of a light truck viewed toward its rear, including cab 10 with its rear window 12, tailgate 14, rear side turn signal lights 16 and 18, CHMSL 20, bumper 22 and tires 24. The vehicle has stopped and its 4-way flasher has been turned on to flash its front turn signal (not shown) and rear turn signal lamps 16, 18. In addition, the CHMSL is also flashing simultaneously and synchronously with the other lamps.

One can visualize the resulting effect upon the operator of another approaching vehicle. Instead of seeing only the horizontally aligned rear turn signal lights flashing, the driver (and occupants) will also see the higher mounted CHMSL simultaneously flashing. The warning effect is thus extended along a multi-linear path of flashing lights from one side to a higher central location and down to the other side of vehicle's rear. This circumscribes a triangular area of alert and warning which is far greater than that of only the horizontal line of sight between conventional dual flashing rear turn signal lights.

For example, in a 2003 PT Cruiser GT Turbo vehicle, the horizontal distance between the two rear turn signal lights is approximately 58 inches. Inwardly inclined lines extending from these lights to the vehicle's CHMSL are each about 43 inches long. The area circumscribed by the resulting equilateral triangle is about 920 square inches. The panorama of this warning geometry, when all three lamps are flashing, is nearly 16 times greater than the horizontal distance between the two turn signal lamps on the vehicle's sides. Thus, one can intuitively and readily appreciate that the invention provides a substantial enhancement of the vehicle's hazard warning system.

In addition, most passenger vehicles and some light trucks are equipped with amber or yellow rear turn signal lights, whereas all CHMSLs in such vehicles, to this inventor's knowledge, emit red light. Therefore, the unique combinations of such flashing multi-colors will further enhance the attention-getting and alerting effect to approaching drivers of a potential or existing vehicle hazard condition.

Figure 2:
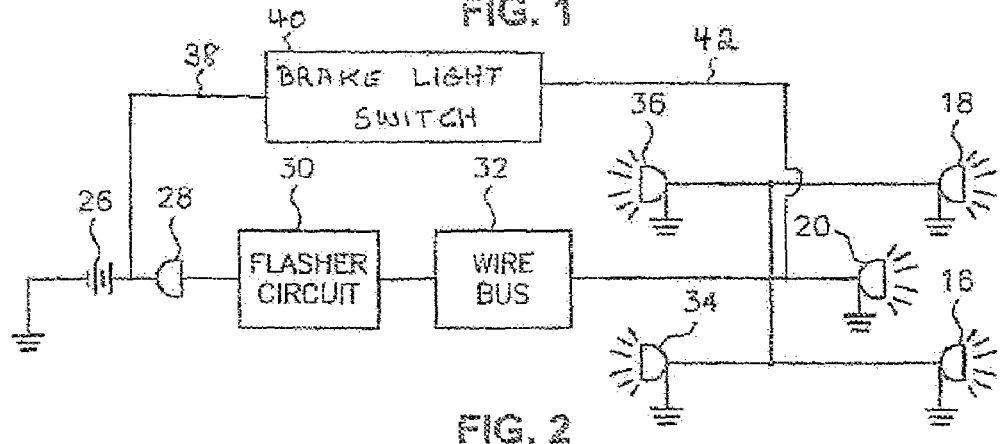
FIG. 2 is a block diagram of a circuit for performing the embodiment illustrated in FIG. 1.

The traffic safety regulations of DOT and NHTSA have long required a CHMSL to turn on and emit a steady red light, (together with the other two conventional rear brake lights) whenever a vehicle's brakes are engaged. Such illumination of a CHMSL in the present invention is illustrated in FIG. 2 as the branch circuit comprising power lead 38, brake light switch 40 and lead 42 connected to CHMSL 20. This circuit is in parallel with the output of 4-way flasher circuit 30 and wire bus 32. As a result, whenever the flasher circuit 30 is turned on to flash CHMSL 20 on and off (together with the other emergency lamps 16, 18, 34 and 36), and while the vehicle's brakes are simultaneously engaged, continuous electrical current from power source 26 is transmitted by the brake switch circuit 38, 40, and 42 to the CHMSL. Therefore, CHMSL 20 turns steady on which overrides and extinguishes the flashing pulses simultaneously emerging from the 4-way flasher circuit 30. When the vehicle's brakes are subsequently disengaged, brake light switch 40 opens to discontinue the continuous current from the brake switch circuit, and visible flashing of the CHMSL and the emergency lamps automatically resumes and continues until the flasher circuit is turned off.

FIG. 2 includes a block diagram circuit comprising power source 26, either the vehicle's storage battery or rectified alternator output, push button 28 to turn the hazard warning lights on, flasher circuit 30, wire bus 32 and branch leads from it to the rear turn signal lights 16, 18, CHMSL 20, and front turn signal lights 34 and 36. Thus, the simple modification of including CHMSL 20 in the hazard flashing circuit is apparent from this figure.

Four-way flasher circuitry in motor vehicles is presently a well-developed technology, having been included in U.S. vehicles for many decades. One specific example of such technology is described in U.S. Pat. No. 5,815,073, the disclosure of which is incorporated by reference herein. This patent describes an inertial switch system for automatically turning on 4-way vehicle emergency lights in cases of sudden braking, accident or collision. A CHMSL can be readily added to this circuit so that it will flash synchronously in such emergencies with the other hazard lights, and most importantly with the rear turn signal lights.

Figure 3:
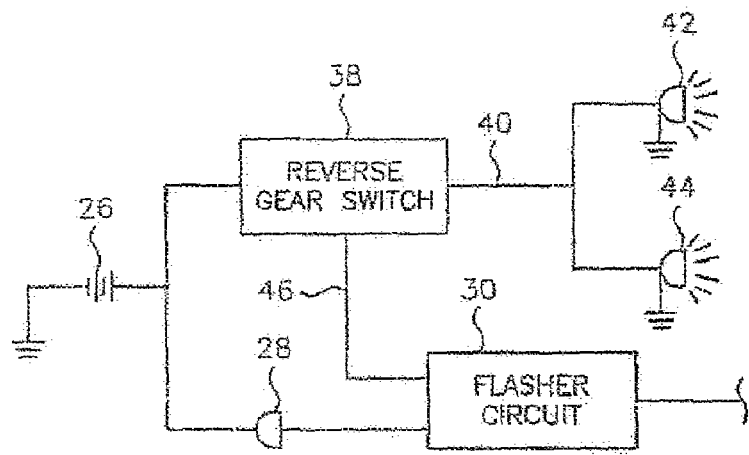
FIG. 3 illustrates a modification of the FIG. 2 diagram for performing another embodiment of the invention.

Referring to FIG. 3, it illustrates a modification of FIG. 2 comprising addition of a branch circuit containing a reverse gear switch 38 which is activated whenever the vehicle is placed in reverse gear to move rearward. As a result, power from source 26 is fed through lead 40 to the clear steady reverse lights 42 and 44 of the vehicle, as well as simultaneously through lead 46 to 4-way flasher circuit 30. In this way, whenever the vehicle moves rearward, the back up lights 42 and 44 turn on steady, and the four signal lights with CHMSL 20 flash synchronously to give an enhanced hazard warning signal that the vehicle is moving rearward. The back up lights 42 and 44 illuminate the rearward path in the dark, and the flashing lights alert other vehicles or observers to stay clear of the path in both daylight and night time.

Rear end collisions among passenger vehicles and light trucks due to braking, slowing, stopped or disabled vehicles continue to be a serious problem in the United States. These accidents are exacerbated in unfavorable conditions created by rain, snow, sleet, hail, fog, smoke, smog and diminished light at twilight, sunrise, sunset and evenings. Therefore, there is a need for a more effective vehicle hazard warning light system. This need is significantly fulfilled by the present invention.

The invention has been described in terms of its functional principles and illustrative specific embodiments. Many variants of such embodiments will be obvious to those skilled in the art. Therefore, it should be understood that the ensuing claims are intended to cover all changes and modifications of the illustrative embodiments which fall within the literal scope of the claims, and all equivalents thereof.

The following is claimed:

1. In a motor vehicle having an emergency 4-way flasher circuit with 4-way emergency lamps, a CHMSL and a brake light switch, an enhanced hazard warning light system consisting essentially of:

(a) means for transmitting pulsed electrical current from the 4-way flasher circuit to the CHMSL when the circuit is activated, thereby simultaneously flashing both the CHMSL and the emergency lamps on and off, and (b) means for transmitting a steady electrical current from the brake light switch to the CHMSL whenever the vehicle's brakes are engaged, whereby (1) when the flasher circuit is activated, the CHMSL is automatically and simultaneously flashed on and off together with the 4-way emergency lamps, (2) when the vehicle's brakes are thereafter engaged, the steady electrical current from the brake light switch automatically overrides and suppresses flashing, and initiates steady illumination, of the CHMSL while the emergency lamps continue flashing, and (3) when the vehicle's brakes are disengaged, simultaneous on and off flashing of the CHMSL together with the 4-way emergency lamps is automatically resumed, the flashing cycle of the CHMSL with the 4-way emergency lamps not including white light during the off periods of such cycle.

2. The system as in claim 1 wherein at least the vehicle's rear turn signal lamps comprise the emergency lamps that flash simultaneously with the CHMSL.

3. The system as in claim 1 wherein at least the vehicle's front and rear turn signal lamps comprise the emergency lamps that flash simultaneously with the CHMSL.

4. The system as in claim 1 wherein the CHMSL emits red light, and the emergency lamps emit red, amber or yellow light.

5. The system as in claim 1 embodied in a passenger vehicle or light truck.

6. The system as in claim 1 which further comprises a reverse gear switch which automatically illuminates at least one steady back up light when the vehicle is placed in reverse gear to move the vehicle rearward, the reverse gear switch also being connected to the 4-way flasher circuit to automatically activate the circuit and thereby initiate simultaneous on and off flashing of the CHMSL and the vehicle's emergency lamps as the vehicle moves rearward.

7. The system as in claim 6 embodied in a passenger vehicle or light truck.

8. In a motor vehicle having an emergency 4-way flasher circuit with 4-way emergency lamps, a CHMSL and a brake light switch, a method of creating an enhanced hazard warning light system consisting essentially of:

(a) connecting the 4-way flasher circuit to the CHMSL, and (b) connecting the brake light switch separately from the 4-way flasher circuit to the CHMSL, whereby (1) when the 4-way flasher circuit is activated, pulsed electrical current from the circuit automatically initiates simultaneous on and off flashing of the CHMSL together with the vehicle's 4-way emergency lamps, (2) when the vehicle's brakes are thereafter engaged, steady electrical current from the brake light switch automatically overrides and suppresses flashing, and initiates steady illumination, of the CHMSL while the emergency lamps continue flashing, and (3) when the vehicle's brakes are disengaged, simultaneous on and off flashing of the CHMSL together with the 4-way emergency lamps is automatically resumed, the flashing cycle of the CHMSL with the 4-way emergency lamps not including white light during the off periods of such cycle.

9. The method as in claim 8 which includes connecting the flasher circuit at least to the vehicle's rear turn signal lamps to flash the rear turn signal lamps simultaneously with the CHMSL.

10. The method as in claim 8 which includes connecting the flasher circuit at least to the vehicle's front and rear turn signal lamps to flash the front and rear turn signal lamps simultaneously with the CHMSL.

11. The method as in claim 10 performed by flashing the front and rear turn signal lamps simultaneously and synchronously with the CHMSL.

12. The method as in claim 8 performed by emitting red light from the CHMSL and red, amber or yellow light from the 4-way emergency lamps.

13. The method as in claim 8 performed in a passenger vehicle or light truck.

14. The method as in claim 8 which further comprises connecting the vehicle's reverse gear switch to at least one steady back up lamp to automatically illuminate the lamp when the vehicle is placed in reverse gear to move the vehicle rearward, and also connecting the reverse gear switch to the 4-way flasher circuit to automatically activate the circuit and initiate simultaneous on and off flashing of both the CHMSL and the vehicle's emergency lamps as the vehicle moves rearward.

15. In a motor vehicle having an emergency 4-way flasher circuit with 4-way emergency lamps, a CHMSL and a brake light switch, an enhanced hazard warning light system consisting of:
  (a) means for transmitting pulsed electrical current from the 4-way flasher circuit to the CHMSL when the circuit is activated thereby simultaneously flashing both the CHMSL and the emergency lamps on and off, and
  (b) means for transmitting a steady electrical current from the brake light switch to the CHMSL whenever the vehicle's brakes are engaged, whereby
  (1) when the flasher circuit is activated, the CHMSL is automatically and simultaneously flashed on and off together with the 4-way emergency lamps,
  (2) when the vehicle's brakes are thereafter engaged, the steady electrical current from the brake light switch automatically overrides and suppresses flashing, and initiates steady illumination, of the CHMSL while the emergency lamps continue flashing, and
  (3) when the vehicle's brakes are disengaged, simultaneous on and off flashing of the CHMSL together with the 4-way emergency lamps is automatically resumed, the flashing cycle of the CHMSL with the 4-way emergency lamps not including white light during the off periods of such cycle.

16. In a motor vehicle having an emergency 4-way flasher circuit with 4-way emergency lamps, a CHMSL and a brake light switch, a method of creating an enhanced hazard warning light system consisting of:
  (a) connecting the 4-way flasher circuit to the CHMSL, and
  (b) connecting the brake light switch separately from the 4-way flasher circuit to the CHMSL, whereby
  (1) when the 4-way flasher circuit is activated, pulsed electrical current from the circuit automatically initiates simultaneous on and off flashing of the CHMSL together with the vehicle's 4-way emergency lamps,
  (2) when the vehicle's brakes are thereafter engaged, steady electrical current from the brake light switch automatically overrides and suppresses flashing, and initiates steady illumination, of the CHMSL while the emergency lamps continue flashing, and
  (3) when the vehicle's brakes are disengaged, simultaneous on and off flashing of the CHMSL together with the 4-way emergency lamps is automatically resumed, the flashing cycle of the CHMSL with the 4-way emergency lamps not including white light during the off periods of such cycle.

* * * * *